United States Patent
Yu et al.

(10) Patent No.: US 9,986,570 B2
(45) Date of Patent: *May 29, 2018

(54) ACCESS POINT APPARATUS FOR CONFIGURING NEXT GENERATION WIRELESS COMMUNICATION NETWORK AND METHOD OF OPERATING THE ACCESS POINT APPARATUS

(71) Applicant: ELECTRONICS AND TELECOMMUNICATIONS RESEARCH INSTITUTE, Daejeon (KR)

(72) Inventors: Hee Jung Yu, Daejeon (KR); Sok Kyu Lee, Daejeon (KR); Hee Soo Lee, Daejeon (KR); Min Ho Cheong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 101 days.

This patent is subject to a terminal disclaimer.

(21) Appl. No.: 15/043,072

(22) Filed: Feb. 12, 2016

(65) Prior Publication Data

US 2016/0165586 A1   Jun. 9, 2016

Related U.S. Application Data

(63) Continuation of application No. 13/933,082, filed on Jul. 1, 2013, now Pat. No. 9,264,909.

(30) Foreign Application Priority Data

Jul. 2, 2012 (KR) .................. 10-2012-0071768
May 8, 2013 (KR) .................. 10-2013-0052001

(51) Int. Cl.
| | |
|---|---|
| *H04W 72/00* | (2009.01) |
| *H04W 72/04* | (2009.01) |
| *H04W 16/14* | (2009.01) |
| *H04W 4/00* | (2018.01) |
| *H04L 12/24* | (2006.01) |
| *H04W 88/10* | (2009.01) |

(52) U.S. Cl.
CPC ....... *H04W 72/048* (2013.01); *H04L 41/0873* (2013.01); *H04W 4/001* (2013.01); *H04W 16/14* (2013.01); *H04W 72/0453* (2013.01); *H04W 88/10* (2013.01); *Y04S 40/162* (2013.01)

(58) Field of Classification Search
CPC .... H04W 16/14; H04W 72/082; H04W 28/04
See application file for complete search history.

(56) References Cited

U.S. PATENT DOCUMENTS

| | | | |
|---|---|---|---|
| 2012/0201213 A1* | 8/2012 | Banerjea | H04W 72/0453 370/329 |
| 2013/0016648 A1* | 1/2013 | Koskela | H04W 92/20 370/315 |
| 2017/0208474 A1* | 7/2017 | Mody | H04W 16/14 |

* cited by examiner

*Primary Examiner* — Shukri Taha

(57) ABSTRACT

Disclosed are an access point apparatus for configuring a next generation wireless communication and a method of operating the access point apparatus. The access point apparatus for configuring the next generation wireless communication may include a verification unit to verify a first available band associated with at least one of a first band and a second band; and a configuration unit to configure a backbone network with another access point apparatus positioned within a predetermined distance, through the verified first available band.

17 Claims, 4 Drawing Sheets

ACCESS POINT APPARATUS FOR CONFIGURING NEXT GENERATION WIRELESS COMMUNICATION NETWORK AND METHOD OF OPERATING THE ACCESS POINT APPARATUS

CROSS-REFERENCE TO RELATED APPLICATIONS

This application is a continuation of U.S. patent application Ser. No. 13/933,082 filed Jul. 1, 2013, which claims the priority benefit of Korean Patent Application No. 10-2012-0071768, filed on Jul. 2, 2012, and Korean Patent Application No. 10-2013-0052001, filed on May 8, 2013, in the Korean Intellectual Property Office, the disclosures of which are incorporated herein by reference.

BACKGROUND

1. Field of the Invention

Embodiments of the present invention relate to technology of configuring a next generation wireless communication network using various bands.

2. Description of the Related Art

A wireless local area network (WLAN) has been used to configure a wireless network in a near field using an unlicensed band of 2.4 GHz and 5 GHz. However, currently, the WLAN using a television white band (TVWS) that is a TV channel unused based on a region and an unlicensed band that is present for each country in a band of 1 GHz or less, for example, in a band of 800 MHz to 900 MHz. Examples of a standard using each band may include Institute of Electrical and Electronics Engineers (IEEE) 802.11af standard and IEEE 802.11ah standard.

Here, in the case of the IEEE 802.11af standard, a bandwidth is wide and a transmission output is high and thus, the IEEE 802.11af standard may be used as an outdoor WLAN that covers a wide area. However, there is an inconvenience to periodically verify TVWS information through an access to a band information server.

The IEEE 802.11ah standard uses an unlicensed band and thus, may be used at all times. However, since a wide bandwidth is not secured, a transmission power may be low.

Accordingly, there is an integrated network configuration technology that may complementarily use advantages of two standards.

SUMMARY

An aspect of the present invention is to configure an integrated network by employing a first available band associated with at least one of a television white space (TVWS) and a band of 1 GHz or less for configuring a backbone network between access point apparatuses and by employing a second available band associated with one of the TVWS and the band of 1 GHz or less for connection between an access point apparatus and a station, thereby effectively using a feature in the TVWS, for example, covering a relatively wide area due to a relatively wide bandwidth and a high transmission output, and a feature in the band of 1 GHz or less, for example, an always available band.

According to an aspect of the present invention, there is provided an access point apparatus including: a verification unit to verify a first available band associated with at least one of a first band and a second band; and a configuration unit to configure a backbone network with another access point apparatus positioned within a predetermined distance, through the verified first available band.

According to another aspect of the present invention, there is provided a method of operating an access point apparatus, the method including: verifying a first available band associated with at least one of a first band and a second band; and configuring a backbone network with another access point apparatus positioned within a predetermined distance, through the verified first available band.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
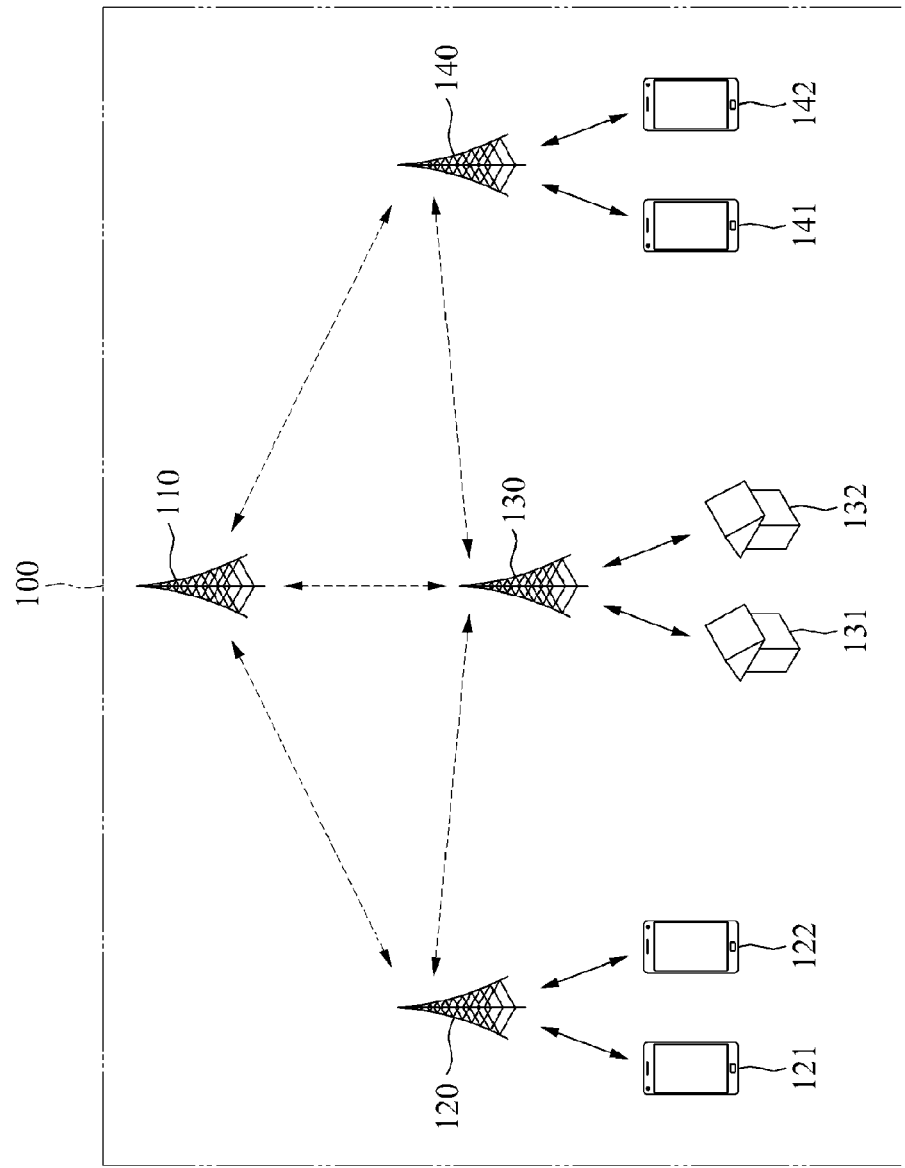
FIG. 1 is a diagram illustrating a configuration of a next generation wireless communication network system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, an access point (AP) apparatus to configure a next generation wireless communication network according to an embodiment of the present invention and a method of operating the AP apparatus will be described with reference to the accompanying drawings.

FIG. 1 is a diagram illustrating a configuration of a next generation wireless communication network system 100 according to an embodiment of the present invention.

Referring to FIG. 1, the next generation wireless communication network system 100 may include a plurality of AP apparatuses and a plurality of stations.

The plurality of AP apparatuses may include, for example, a first AP apparatus 110, a second AP apparatus 120, a third AP apparatus 130, and a fourth AP apparatus 140.

The first AP apparatus 110 may perform, for example, a control center function and may configure a backbone network together with the second AP apparatus 120, the third AP apparatus 130, and the fourth AP apparatus 140.

The second AP apparatus 120 may perform, for example, a data collector and control function, may configure a backbone network together with the first AP apparatus 110, the third AP apparatus 130, and the fourth AP apparatus 140, and may be connected to a first station 121 and a second station 122.

Similar to the second AP apparatus 120, the third AP apparatus 130 may perform a data collector and control function, may configure a backbone network together with the first AP apparatus 110, the second AP apparatus 120, and the fourth AP apparatus 140, and may be connected to a third station 131 and a fourth station 132.

The fourth AP apparatus 140 may perform, for example, an outdoor hotspot function, may configure a backbone network together with the first AP apparatus 110, the second AP apparatus 120, and the third AP apparatus 130, and may be connected to a fifth station 141 and a sixth station 142.

Here, a first available band used for configuring a backbone network between the first through the fourth AP apparatuses 110, 120, 130, and 140 may be associated with at least one of a television white space (TVWS) and a band of 1 GHz or less.

Also, a second available band used for connection between the second through the fourth AP apparatuses 120, 130, and 140, and the first through the sixth stations 121 and 122, 131 and 132, and 141 and 142 may be associated with one of the TVWS band and the band of 1 GHz or less.

The plurality of stations may include, for example, the first station 121, the second station 122, the third station 131, the fourth station 132, the fifth station 141, and the sixth station 142.

The first station 121 and the second station 122 may be sensor terminals to sense, for example, peripheral information such as a temperature, and may be connected to the second AP apparatus 120

The third station 131 and the fourth station 132 may be terminals to support, for example, a smart grid mitering function, and may be connected to the third AP apparatus 130.

The fifth station 141 and the sixth station 142 may be terminals to support, for example, a data communication function, and may be connected to the fourth AP apparatus 140.

Figure 2:
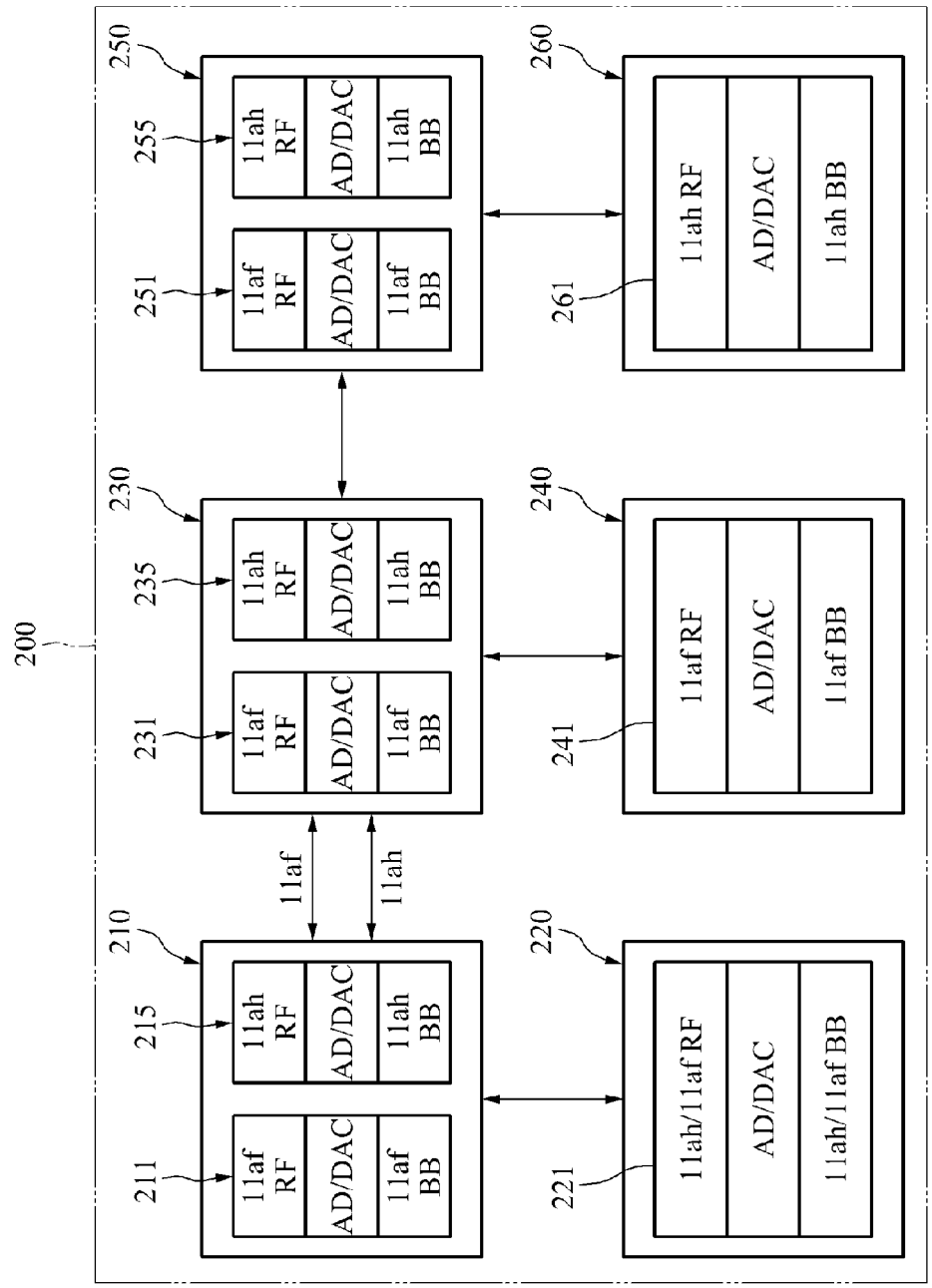
FIG. 2 is a diagram illustrating an example of a configuration of a next generation wireless communication network system according to an embodiment of the present invention.

FIG. 2 is a diagram illustrating an example of a configuration of a next generation wireless communication network system 200 according to an embodiment of the present invention.

Referring to FIG. 2, the next generation wireless communication network system 200 may include a first AP apparatus 210, a second AP apparatus 230, a third AP apparatus 250, a first station 220, a second station 240, and a third station 260.

The first AP apparatus 210, the second AP apparatus 230, and the third AP apparatus 250 may include first communication modules 211, 231, and 251 to support communication in a first band and second communication modules 215, 235, and 255 to support communication in a second band, respectively. Here, the first communication modules 211, 231, and 251 may support communication in, for example, a TVWS band, that is, an 11af band. The second communication modules 215, 235, and 255 may support communication in the band of 1 GHz or less, that is, the 11ah band.

The first AP apparatus 210 may configure a backbone network with the second AP apparatus 230 by simultaneously employing the first band and the second band through, for example, the first communication module 211 and the second communication module 215.

The second AP apparatus 230 may configure a backbone network with the first AP apparatus 210 by simultaneously employing the first band and the second band through the first communication module 231 and the second communication module 235, and may also configure a backbone network with the third AP apparatus 250 by employing one of the first band and the second band through the first communication module 231 or the second communication module 235.

The third AP apparatus 250 may configure a backbone network with the second AP apparatus 230 by employing one of the first band and the second band through, for example, the first communication module 251 or the second communication module 255.

The first station 220, the second station 240, and the third station 260 may include single communication modules 221, 241, and 261 to support communication in the first band or the second band, respectively.

The first station 220 may be connected to the first AP apparatus 210 by employing one of the first band and the second band through, for example, the single communication module 221.

The second station 240 may be connected to the second AP apparatus 230 by employing the first band through, for example, the single communication module 241.

The third station 260 may be connected to the third AP apparatus 250 by employing the second band through the single communication module 261.

Figure 3:
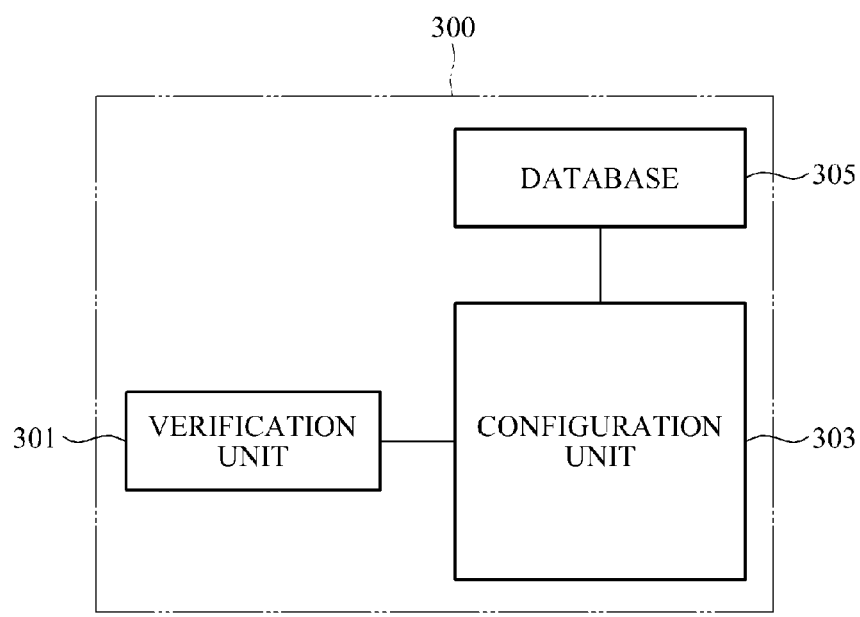
FIG. 3 is a block diagram illustrating a configuration of an access point apparatus to configure a next generation wireless communication network according to an embodiment of the present invention.

FIG. 3 is a block diagram illustrating a configuration of an AP apparatus 300 to configure a next generation wireless communication network according to an embodiment of the present invention.

Referring to FIG. 3, the AP apparatus 300 to configure the next generation wireless communication network may include a verification unit 301, a configuration unit 303, and a database 305.

The verification unit 301 may verify a first available band associated with at least one of a first band and a second band. Here, the first band may be, for example, a TVWS, and the second band may be, for example, an unlicensed band of 1 GHz or less.

Here, the verification unit 301 may preferentially verify, as the first available band, a candidate band available in the first band, and may verify, as the first available band, a candidate band available in the second band when the available candidate band is absent in the first band. That is, a high transmission rate is required to configure a backbone network with another AP point. Accordingly, when verifying the first available band used to configure the backbone network, the verification unit 301 may initially verify the TVWS band as the first band and may additionally verify the unlicensed band of 1 GHz or less as the second band.

Also, the verification unit 301 may further verify a second available band associated with one of the first band and the second band. Here, the verification unit 301 may preferentially verify, as the second available band, a candidate band available in the second band, and may verify, as the second available band a candidate band available in the first band when a distance between the AP apparatus 300 and the station is greater than or equal to a predetermined interval. That is, for connecting to the station, there is a need to enable communication at all times compared to a high transmission rate. Accordingly, when verifying the second available band used for connecting to the station, the verification unit 301 may initially verify the unlicensed band of 1 GHz or less as the second band. When a communication distance is limited due to constraints in transmission output, the verification unit 301 may verify the TVWS band as the first band.

Meanwhile, the verification unit 301 may verify a current position, may obtain, from a band information server (not shown), a candidate band available in the first band corresponding to the verified current position, and may verify the first available band or the second available band based on the obtained candidate band. Also, when the current position varies every predetermined time or when the obtained candidate band is verified to be unavailable, the verification unit 301 may obtain again another available candidate band from the band information server and may update the first available band or the second available band based on the obtained candidate band.

The verification unit 301 may verify identification information of a country associated with a current position, may obtain, from the database 305, a candidate band available in the second band corresponding to the verified identification information of the country, and may verify the first available band or the second available band based on the obtained candidate band. Here, the verification unit 301 may obtain identification information of a country associated with the current position from the database 305 or may receive an input of the identification information.

The configuration unit 303 may configure a backbone network with another AP apparatus positioned within a predetermined distance, through the verified first available band. Here, the configuration unit 303 may also configure a backbone network using a multi-antenna multi-user multiple input multiple output (MIMO) communication technology.

Also, the configuration unit 303 may be connected to a station positioned within a predetermined distance through the verified second available band.

The database 305 may store identification information of a country for each position and a candidate band available in the second band for each set of ID information of a country.

Figure 4:
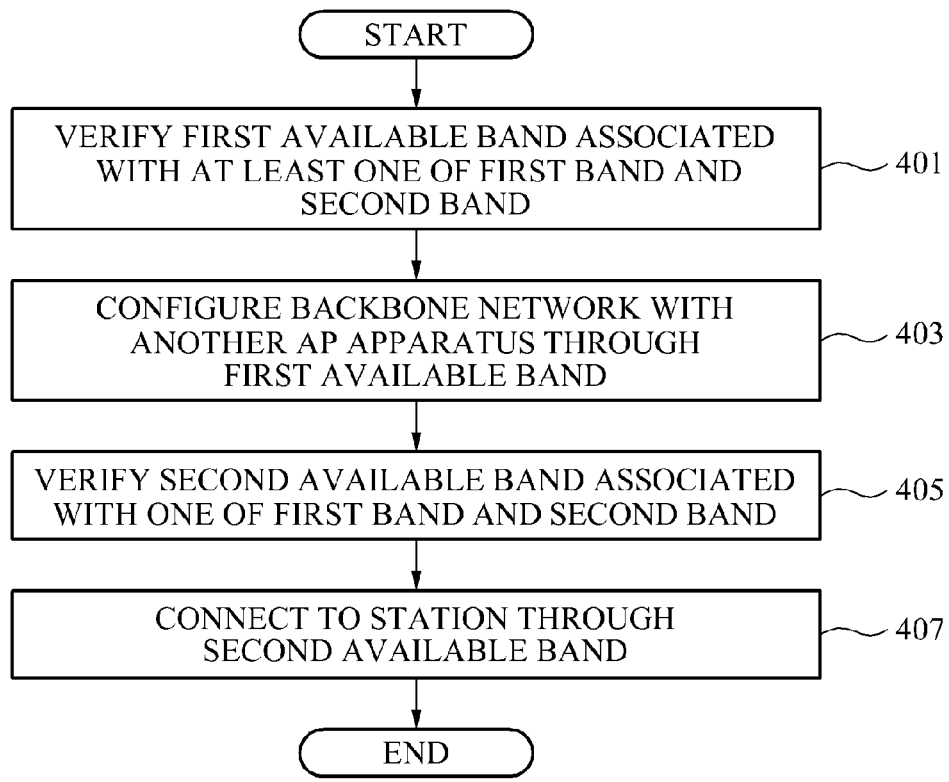
FIG. 4 is a flowchart illustrating a method of operating an access point apparatus to configure a next generation wireless communication network system according to an embodiment of the present invention.

FIG. 4 is a flowchart illustrating a method of operating an AP apparatus to configure a next generation wireless communication network system according to an embodiment of the present invention.

Referring to FIG. 4, in operation 401, the AP apparatus may verify a first available band associated with at least one of a first band and a second band. Here, the first band may be, for example, a TVWS band, and the second band may be, for example, an unlicensed band of 1 GHz or less.

Here, the AP apparatus may preferentially verify, as the first available band, a candidate band available in the first band, and may verify, as the first available band, a candidate band available in the second band when the available candidate band is absent in the first band.

In operation 403, the AP apparatus may configure a backbone network with another AP apparatus positioned within a predetermined distance through the first available band.

In operation 405, the AP apparatus may verify a second available band associated with one of the first band and the second band. Here, the AP apparatus may preferentially verify, as the second available band, a candidate band available in the second band, and may verify, as the second available band a candidate band available in the first band when a distance between the AP apparatus and the station is greater than or equal to a predetermined interval.

In operation 407, the AP apparatus may be connected to a station positioned within a predetermined distance through the second available band.

Although it is described herein that an AP apparatus may be connected to a station after configuring a backbone network with another AP apparatus, the AP apparatus may configure the backbone network with the other AP apparatus after connecting to the station.

In operation 401 or 405, the AP apparatus may verify a current position, may obtain, from a band information server, a candidate band available in the first band corresponding to the verified current position, and may verify the first available band or the second available band based on the obtained candidate band.

Also, when the current position varies every predetermined time or when the obtained candidate band is verified to be unavailable, the AP apparatus may obtain again another available candidate band from the band information server and may update the first available band or the second available band based on the obtained candidate band.

In operation 401 or 405, the AP apparatus may verify identification information of a country associated with a current position, may obtain, from a database, a candidate band available in the second band corresponding to the verified identification information of the country, and may verify the first available band or the second available band based on the obtained candidate band.

According to embodiments of the present invention, it is possible to configure an integrated network by employing a first available band associated with at least one of a TVWS and a band of 1 GHz or less for configuring a backbone network between AP apparatuses and by employing a second available band associated with one of the TVWS and the band of 1 GHz or less for connection between an AP apparatus and a station, thereby effectively using a feature in the TVWS, for example, covering a relatively wide area due to a relatively wide bandwidth and a high transmission output, and a feature in the band of 1 GHz or less, for example, an always available band.

Accordingly, in the case of configuring a wireless communication network using an IEEE 802.11af standard based on the TVWS band and an IEEE 802.11ah standard based on the unlicensed band of 1 GHz or less, it is possible to configure an integrated network capable of providing a WLAN service even in a wide outdoor environment and also providing even a sensor network such as a smart grid and the like.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An access point, comprising:
a first communication module configured to provide communication in a first band;
a second communication module configured to provide communication in a second band; and
a processor configured to:
configure a backbone network between the access point and another access point, by using at least one of the first communication module and the second communication module, and
connect between the access point and a station, by using one of the first communication module and the second communication module, or by alternatively using the first communication module and the second communication module,
wherein a first candidate band is determined in the first band first, and the first candidate band is determined in the second band when there is no available candidate band in the first band,
wherein a second candidate band is determined in the second band first, and the second candidate band is determined in the first band when a distance between the access point and the station satisfies a predetermined criteria, and
wherein the first band is available when verified by a band information server, and the second band is an unlicensed band and is available without a verification by the band information server.

2. The access point of claim 1, wherein the first band is a television white space (TVWS) band.

3. The access point of claim 1, wherein the second band is a band of 1 GHz or less.

4. The access point of claim 1, wherein the processor is further configured to obtain information associated with the first band, based on a current position.

5. The access point of claim 1, wherein the processor is further configured to obtain information associated with the second band, based on identification information of a country.

6. The access point of claim 1, wherein the processor is further configured to use the first communication module for connection between the access point and the station, when a distance between the access point and the station is greater than a predetermined interval.

7. The access point of claim 1, wherein the processor is further configured to use the second communication module for connection between the access point and the station, when a distance between the access point and the station is less than a predetermined interval.

8. The access point of claim 1, wherein the first band uses a first communication standard and the second band uses a second communication standard different from the first communication standard.

9. A method of operating an access point, comprising:
configuring a backbone network between the access point and another access point, by using at least one of the first communication module supporting communication in a first band and the second communication module supporting communication in a second band; and
connecting between the access point and a station, by using one of the first communication module and the second communication module, or by alternatively using the first communication module and the second communication module,
wherein a first candidate band is determined in the first band first, and the first candidate band is determined in the second band when there is no available candidate band in the first band,
wherein a second candidate band is determined in the second band first, and the second candidate band is determined in the first band when a distance between the access point and the station satisfies a predetermined criteria, and
wherein the first band is available when verified by a band information server, and the second band is an unlicensed band and is available without a verification by the band information server.

10. The method of claim 9, wherein the first band is a television white space (TVWS) band.

11. The method of claim 9, wherein the second band is a band of 1 GHz or less.

12. The method of claim 9, further comprising obtaining information associated with the first band, based on a current position.

13. The method of claim 9, further comprising obtaining information associated with the second band, based on identification information of a country.

14. The method of claim 9, wherein the first communication module is used for connection between the access point and the station, when a distance between the access point and the station is greater than a predetermined interval.

15. The method of claim 9, wherein the second communication module is used for connection between the access point and the station, when a distance between the access point and the station is less than a predetermined interval.

16. The method of claim 9, wherein the first band uses a first communication standard and the second band uses a second communication standard different from the first communication standard.

17. A non-transitory computer-readable storage medium which stores a computer program that includes instructions configured to cause a computer to perform the method of claim 9.

* * * * *